United States Patent
Faucher et al.

(10) Patent No.: US 6,178,467 B1
(45) Date of Patent: Jan. 23, 2001

(54) MICROPROCESSOR SYSTEM REQUESTS BURSTABLE ACCESS TO NONCACHEABLE MEMORY AREAS AND TRANSFERS NONCACHEABLE ADDRESS ON A BUS AT BURST MODE

(75) Inventors: Marc R. Faucher, South Burlington; Paul T. Gutwin, Williston, both of VT (US)

(73) Assignee: International Business Machines Corporation, Armonk, NY (US)

(*) Notice: Under 35 U.S.C. 154(b), the term of this patent shall be extended for 0 days.

(21) Appl. No.: 09/111,611

(22) Filed: Jul. 7, 1998

(51) Int. Cl.⁷ .............................. G06F 13/00; G06F 12/00
(52) U.S. Cl. .................................. 710/4; 710/35; 711/117
(58) Field of Search .................................... 710/4, 11, 22, 710/26, 35, 105, 33, 34; 711/3, 138, 117, 129, 218

(56) References Cited

U.S. PATENT DOCUMENTS

| | | |
|---|---|---|
| 5,131,083 | 7/1992 | Crawford et al. . |
| 5,146,582 | 9/1992 | Begun . |
| 5,255,378 | 10/1993 | Crawford et al. . |
| 5,469,544 | 11/1995 | Aatresh et al. . |
| 5,469,558 * | 11/1995 | Lieberman et al. ............... 710/105 |
| 5,517,626 | 5/1996 | Archer et al. . |
| 5,596,731 | 1/1997 | Martinez, Jr. et al. . |
| 5,634,030 * | 5/1997 | Nakano ........................... 395/421.03 |
| 5,640,517 * | 6/1997 | Parks et al. ........................ 710/105 |
| 5,644,788 * | 7/1997 | Courtright et al. ................. 395/855 |
| 5,664,148 * | 9/1997 | Mulla et al. ........................ 711/138 |
| 5,669,014 * | 9/1997 | Iyengar et al. ..................... 395/842 |
| 5,749,092 * | 5/1998 | Heeb et al. ........................ 711/138 |
| 5,875,466 * | 2/1999 | Wakerly ............................. 711/138 |
| 5,911,151 * | 6/1999 | Circello et al. ..................... 711/201 |
| 5,937,172 * | 8/1999 | Arimilli et al. .................... 395/285 |
| 6,009,493 * | 12/1999 | Fujiyama ............................... 711/1 |
| 6,032,225 * | 2/2000 | Shiell et al. ....................... 711/117 |

FOREIGN PATENT DOCUMENTS

0782079 * 7/1997 (EP) .............................. G06F/12/08

OTHER PUBLICATIONS

D. Anderson et al., "Pentium Processor System Architecture", Second Edition, PC System Architecture Series, pp. 53, 120, 179, 183, 210–212.

* cited by examiner

Primary Examiner—Thomas C. Lee
Assistant Examiner—Chun Cao
(74) Attorney, Agent, or Firm—Ratner & Prestia; Eugene I. Shkurko

(57) ABSTRACT

A method and system for transferring data between a processor and a device residing at a non-cacheable address. The method includes the steps of asserting the non-cacheable address onto an address bus, asserting a first signal indicating that the processor has data ready for burst mode transfer between the processor and a device residing at the non-cacheable address, asserting a second signal indicating that the device is ready for the burst mode transfer, and performing a burst mode transfer of a plurality of bytes between the processor and the non-cacheable address. The method of the invention provides both sequential and non-sequential burst transfer modes. The system of the invention provides a processor, a device, bus control logic, and non-cacheable address logic. The bus control logic and the non-cacheable address logic are configured to implement new semantic meanings for the CACHE# and KEN# signals that eliminate the distinction between cacheable and non-cacheable address space for purposes of allowing burst mode transfers.

18 Claims, 4 Drawing Sheets

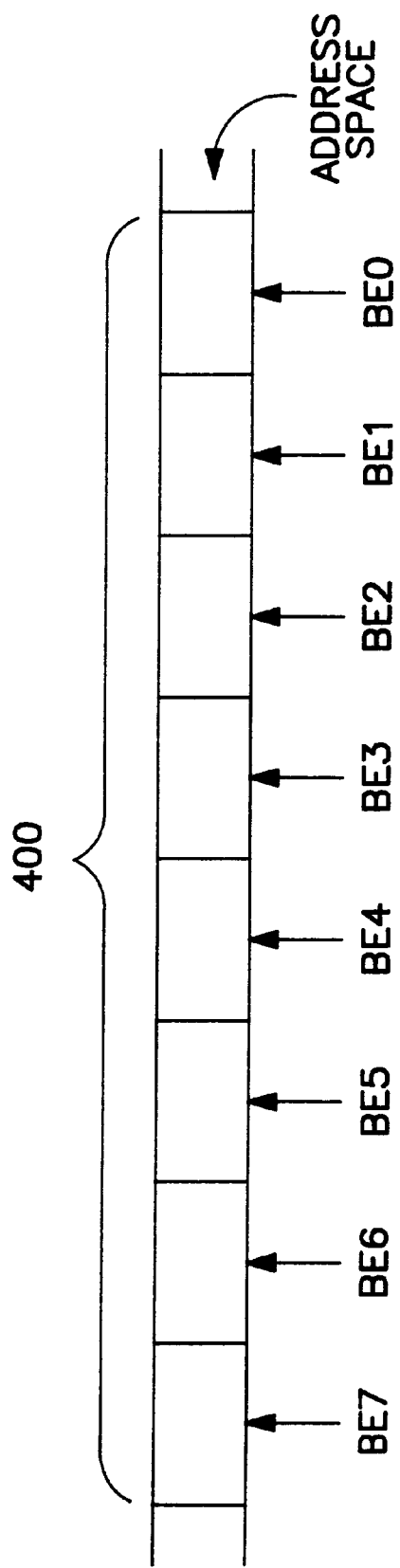

MICROPROCESSOR SYSTEM REQUESTS BURSTABLE ACCESS TO NONCACHEABLE MEMORY AREAS AND TRANSFERS NONCACHEABLE ADDRESS ON A BUS AT BURST MODE

TECHNICAL FIELD

The present invention pertains generally to transfers between a central processing unit and memory, and pertains specifically to enhancing the bandwidth and efficiency of burst mode transfers involving a Pentium™ processor.

BACKGROUND OF THE INVENTION

Microprocessor-based computer systems typically include a microprocessor, a memory subsystem, and system logic, intercoupled by a local (system) bus. The microprocessor may include an internal L1 (level one) cache memory that stores frequently accessed data on-board the microprocessor chip. In this manner, if requested data resides in the L1 cache, the microprocessor can access it without running an external bus cycle.

The memory subsystem can include both external system Dynamic Random Access Memory (DRAM) memory, along with an external L2 (level two) cache. Together, the external system memory and the L2 cache form a memory hierarchy.

The system logic includes a memory/bus controller that, together with the microprocessor, implements a bus protocol for transferring data between the microprocessor and the memory subsystem. If a central processing unit (CPU) requests to access a piece of data that is absent from the cache, then that CPU access "misses" the cache. If the CPU access (read or write) misses in the internal L1 cache, the microprocessor runs an external bus cycle to access the memory subsystem. The access will be serviced by the L2 cache or, if that access misses, the system DRAM memory.

A computer system based upon the Intel® 586 or Pentium™ microprocessor uses 64-bit internal and external data buses able to transfer eight bytes (two doublewords or one quadword) at a time. The internal L1 cache consists of four lines, with each line containing one quadword or eight bytes of data, such that cache line fills (reads) and replacements (writes) require four 64-bit (quadword) transfers between the microprocessor and the memory subsystem (L2 cache or system DRAM).

According to the conventional 586 bus architecture and protocol, external bus cycle transfers between the microprocessor and the memory subsystem occur in either burst or non-burst mode. Burst mode bus cycles transfer in sequence the four quadwords of an L1 cache-line fill, replacements, or snoop write-backs in response to cache inquiries during DMA (direct memory access) operations. In addition, some microprocessors support write gathering in which writes to the contiguous bytes of a cache line are gathered in internal write buffers and then written out to the memory subsystem in burst mode. Non-burst mode bus cycles are used to transfer (read/write) one to eight bytes at a time in a single bus transfer.

The 586 bus architecture supports pipelined bus cycles. The bus cycle control signal NA# (next address) is driven by the system during a current bus cycle, before the last BRDY# (burst ready) signal has been returned, to request that the microprocessor assert address/control signals for the next pending bus cycle request, designated a pipeline bus cycle. NA# is ignored if there is no pending bus cycle request, or if either the current or next bus cycle is a line replacement or snoop write-back cycle.

Whether an external bus cycle is a burst or non-burst transfer is determined by the microprocessor CACHE# and W/R# bus cycle definition signals, and the system KEN# (cache enable) signal. If CACHE# is asserted for a read cycle, and the system returns KEN#, then the read is converted to a burst fill cycle. Asserting CACHE# for a write cycle indicates a cache line replacement or snoop write-back (or, possibly, a gathered write).

Under the current Pentium™ or 586 bus protocol, burst mode transfers are limited to cacheable addresses. The protocol does not support burst mode transfers to non-cacheable addresses, such as those assigned to memory-mapped input/output (or I/O) devices. When the Pentium™ protocol was defined, this burst mode limitation was insignificant because such memory-mapped I/O devices were too slow to benefit from burst mode transfers. The speed of those devices has now increased, however, so that they would now benefit from burst mode transfers. Accordingly, there now exists a need in the art for a bus protocol that supports burst mode transfers to both cacheable and non-cacheable addresses.

SUMMARY OF THE INVENTION

To meet this and other needs, and in view of its purposes, the present invention provides a method and system for transferring data between a processor and an address within an address space. The address space includes a cacheable address space and a non-cacheable address space, with the address residing in the non-cacheable address space and thus being a non-cacheable address.

The method comprises the steps of asserting the non-cacheable address onto an address bus, asserting a first signal indicating that the processor has data ready for burst mode transfer between the processor and a device residing at the non-cacheable address, asserting a second signal indicating that the device is ready for the burst mode transfer, and performing a burst mode transfer of a plurality of bytes between the processor and the non-cacheable address.

The invention provides a system for transferring data between a processor and a location within an address space. The address space includes a cacheable address space and a non-cacheable address space, and the location resides in the non-cacheable address space at a non-cacheable address. The system comprises a processor, a device, bus control logic, and non-cacheable address logic. The bus control logic and the non-cacheable address logic are configured to implement new semantic meanings for the CACHE# and KEN# signals that eliminate the distinction between cacheable and non-cacheable address space for purposes of allowing burst mode transfers.

The processor is configured to assert a non-cacheable address onto an address bus, and the device resides at the non-cacheable address. The bus control logic is coupled to the processor and asserts a signal indicating that the processor has data ready for burst mode transfer between the processor and the device. The non-cacheable address logic is responsive to the first signal, and asserts a signal indicating that the device is ready for the burst mode transfer. The processor is responsive to the signal from the non-cacheable address logic to transfer a plurality of bytes between the processor and the device in burst mode.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures:

FIG. 4 is a block diagram illustrating the byte-enable lines and the quadword addressing scheme of the present invention.

DETAILED DESCRIPTION OF THE INVENTION

The invention provides a method of performing a sequential burst mode transfer of a plurality of bytes between a processor and a sequence of non-cacheable addresses. The sequential burst mode transfer includes at least one bus cycle. In the sequential burst mode, the address is incremented after each bus cycle in the burst mode transfer.

Figure 1:
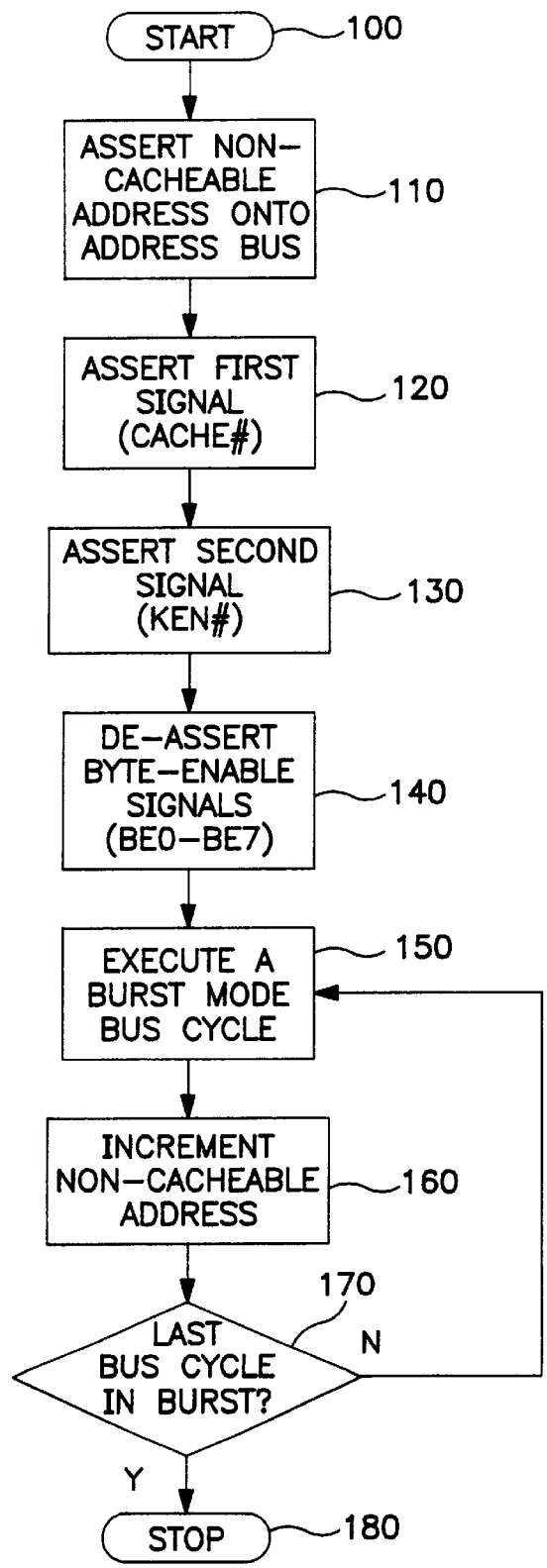
FIG. 1 is a chart illustrating the sequential burst mode protocol of the present invention.

FIG. 1 is a chart illustrating the sequential burst mode protocol of the invention. The sequential burst mode transfer method starts at step 100 and includes the general steps of asserting a non-cacheable address onto an address bus (step 110), asserting a first signal indicating that the processor has data ready for burst mode transfer (step 120), asserting a second signal indicating that a device is ready for the burst mode transfer (step 130), de-asserting a plurality of byte-enable signals (step 140), executing a burst mode bus cycle (step 150), incrementing the non-cacheable address asserted on the address bus (step 160), and repeating the last two steps for each bus cycle in the burst mode transfer (step 170). The method is completed and stops at step 180.

After beginning a sequential burst mode transfer, as marked at start step 100, the processor asserts a non-cacheable address onto an address bus, as shown in step 110. The processor then asserts a first signal indicating that the processor has data ready for burst mode transfer between itself and a device residing at the non-cacheable address asserted on the address bus, as shown in step 120. This first signal corresponds generally to the CACHE# signal as defined by the Pentium™ bus specification. Under the Pentium™ bus specification, the CACHE# signal means only that the processor is ready to perform a cache line-fill or write-back using a burst mode bus cycle. Under the Pentium™ bus specification, however, at the time that CACHE# is asserted, the bus cycle is not yet converted to a burst cycle, as explained further below.

The protocol as defined by the invention changes the meaning of the CACHE# signal as defined by the Pentium™ bus specification. In the invention, the CACHE# signal means that the processor has one or more bytes of data ready for burst mode transfer. Under the protocol of the invention, the bus cycle becomes a burst cycle at the time that CACHE# is asserted. The CACHE# signal is driven by logic interfacing the microprocessor to the system busses, often referred to as the bus interface unit. The microprocessor is configured to implement the invention by asserting CACHE# when the microprocessor has enough data to fill a burst mode transfer.

After the first signal is asserted (step 120), the chipset logic asserts a second signal indicating that the device is ready for the burst mode transfer, as shown at step 130. This second signal corresponds generally to the KEN# signal defined by the Pentium™ bus specification. Under the Pentium™ bus specification, the KEN# signal originates at the Non-Cacheable Address (NCA) logic, is asserted in response to the CACHE# signal to indicate that the address is cacheable, and converts the current bus cycle to a burst mode transfer. The NCA, under the Pentium™ bus specification, is programmed to detect non-cacheable addresses and prevent burst mode transfers involving such addresses.

The protocol as defined by the invention changes the meaning of the KEN# signal as defined by the Pentium™ bus specification. In the invention, the KEN# signal means that the device is ready to accept burst mode data. In the protocol as defined by the invention, the bus cycle is already a burst mode cycle before the KEN# signal is asserted, so the KEN# signal essentially becomes a "device ready" signal. The KEN# signal is driven by hardware within the system logic, and the definition of KEN# is implemented by modifying the hardware comprising the system logic.

Referring to FIG. 4, under the Pentium™ bus specification, each address, when asserted onto the Pentium™ bus, selects an eight-byte location 400 within the address space for access. This eight-byte location 400 is called a quadword, meaning that four two-byte word locations have been selected for access. To control access within this quadword, the Pentium™ bus specification defines eight byte-enable (BE7:BE0) signals, with one byte-enable signal corresponding to each of the eight bytes in the quadword 400. Thus, the status of the byte-enable signals (BE7:BE0) indicates both the width and the alignment of the data being transferred during a given bus cycle. During burst mode transfers, the Pentium™ bus specification requires that all eight byte-enable signals (BE7:BE0) be de-asserted.

Referring back to FIG. 1, under the protocol of the invention for a sequential burst-mode transfer, all eight of the byte-enable (BE7:BE0) signals are de-asserted at the same time that CACHE# is asserted. A plurality of data bytes, typically eight bytes, is then transferred in burst mode, as indicated at step 150, between the processor and the byte locations selected by the non-cacheable address at which the device resides. After this transfer, the non-cacheable address asserted on the address bus is incremented to select a second plurality of byte locations, which is the next sequential quadword location in the address space, as indicated in step 160. The steps of transferring and incrementing shown in steps 150 and 160 are repeated for each bus cycle in the burst mode transfer, as illustrated by the decision step 170.

Figure 2:
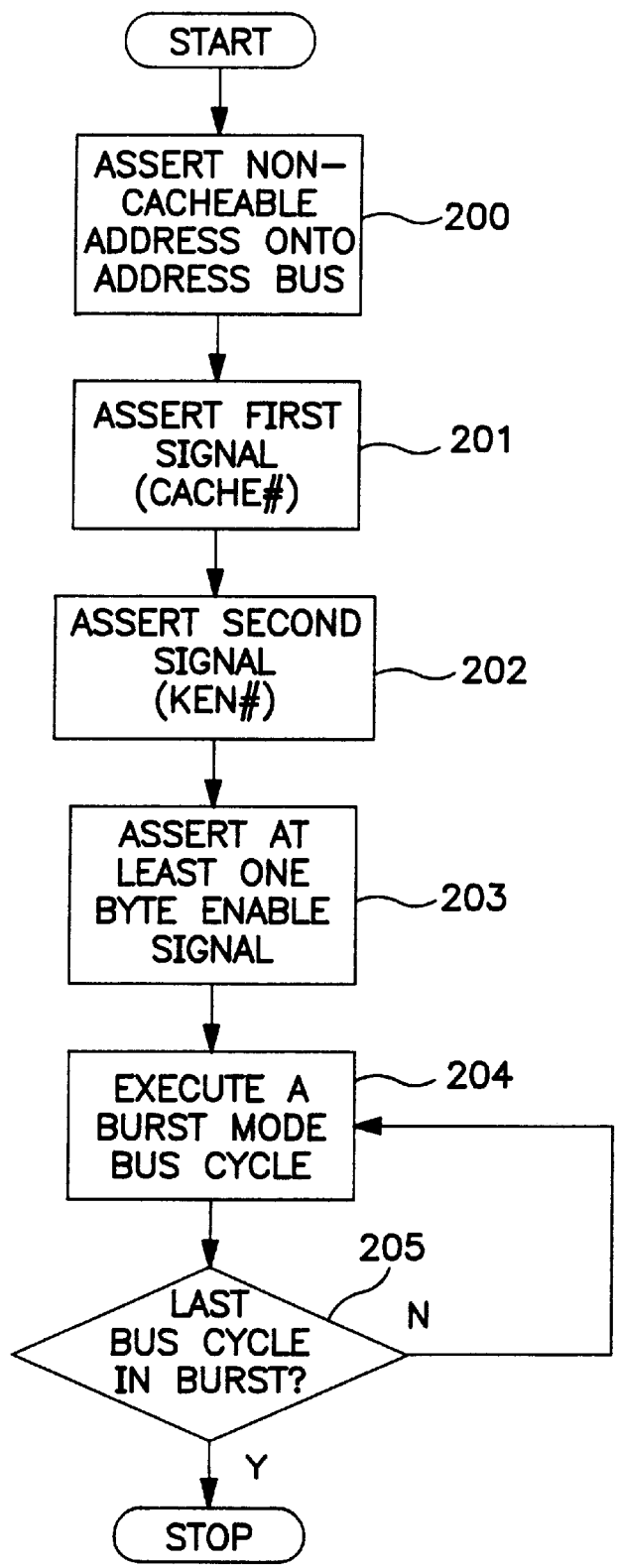
FIG. 2 is a chart illustrating the non-sequential burst mode protocol of the present invention.

Referring now to FIG. 2, the invention also provides a method of performing a non-sequential burst mode transfer of a plurality of bytes between a processor and a single non-cacheable address. Like the sequential burst mode transfer described above, the burst mode transfer includes at least one bus cycle. Unlike the sequential burst mode transfer, the target address is not incremented for each bus cycle; instead, successive bus cycles access the same target address. Such non-incrementing burst mode transfers are especially useful when exchanging multiple bytes of data between the processor and a device capable of quickly processing sequential bytes of data, where the device resides at a non-cacheable address. If the device processes data sufficiently quickly, then it can exchange data with the processor in burst mode.

The non-sequential burst mode transfer protocol includes the general steps of asserting the non-cacheable address onto an address bus (step 200), asserting a first signal indicating that the processor has data ready for burst mode transfer (step 201), asserting a second signal indicating that the device is ready for the burst mode transfer (step 202), asserting at least one byte-enable signal (step 203), transferring at least a byte of data in burst mode between the processor and the at least one byte location (block 204), and repeating the transferring step for each bus cycle in the burst mode transfer (step 205).

Like the sequential burst mode transfer, the non-sequential burst mode transfer begins with the processor asserting a non-cacheable address onto the address bus, as shown in step 200. This non-cacheable address selects a quadword memory location that includes eight one-byte memory locations, as shown in FIG. 4. The processor then asserts a first signal indicating that it has data ready for burst mode transfer between itself and a device residing at one or more of the non-cacheable byte locations, as shown in step 201. As with the sequential burst mode transfer, the first signal corresponds generally to the CACHE# signal defined by the Pentium™ bus specification. As discussed above, the protocol of the invention essentially re-defines the meaning of the CACHE# signal defined by the Pentium™ bus specification.

After the processor asserts the first signal, the chipset logic asserts a second signal indicating that the device is ready for the burst mode transfer, as shown in step 202. This step is the same as in the sequential burst mode transfer discussed above. As discussed above, this second signal corresponds generally to the KEN# signal as defined by the Pentium™ bus specification, and the protocol of the invention essentially re-defines the meaning of the KEN# signal.

After the chipset asserts the second signal, the method of the non-sequential burst mode transfer parts ways with the method of the sequential burst mode transfer described above. In the non-sequential burst mode transfer, at least one of the byte-enable signals (BE0–BE7) is asserted, as shown in step 203. The status of each byte-enable signal (BE0–BE7) determines whether the byte corresponding to that signal is selected to participate in the burst mode transfer.

As before, data width is dictated by the number of byte-enable signals that are asserted, and data alignment is dictated by the location of the asserted byte-enable signals within the selected quadword memory location. Burst mode transfers to 8-, 16-, and 32-bit wide target addresses are selected by enabling one-, two-, or four-byte enable signals, respectively. The alignment of the transfer depends on which specific byte-enable signals are asserted within the quadword memory location. The current Pentium™ bus protocol only supports 32-bit transfers. The invention can be applied, however, to 64-bit wide target addresses if the performance enhancement of such an application would outweigh the effort to modify the underlying Pentium™ bus protocol.

Once the selected byte-enable signal has, or signals have, been asserted, at least a byte of data is transferred in burst mode between the processor and the at least one byte location corresponding to the asserted byte-enable signal, as shown in step 204. The transfer step in step 204 is repeated for each bus cycle in the burst mode transfer, as illustrated in decision step 205. Unlike the sequential burst mode transfer described above, the target address is not incremented for the next bus cycle; instead each bus cycle exchanges data with the same single non-cacheable target address. For each bus cycle, the contents of the data bus are updated.

Figure 3:
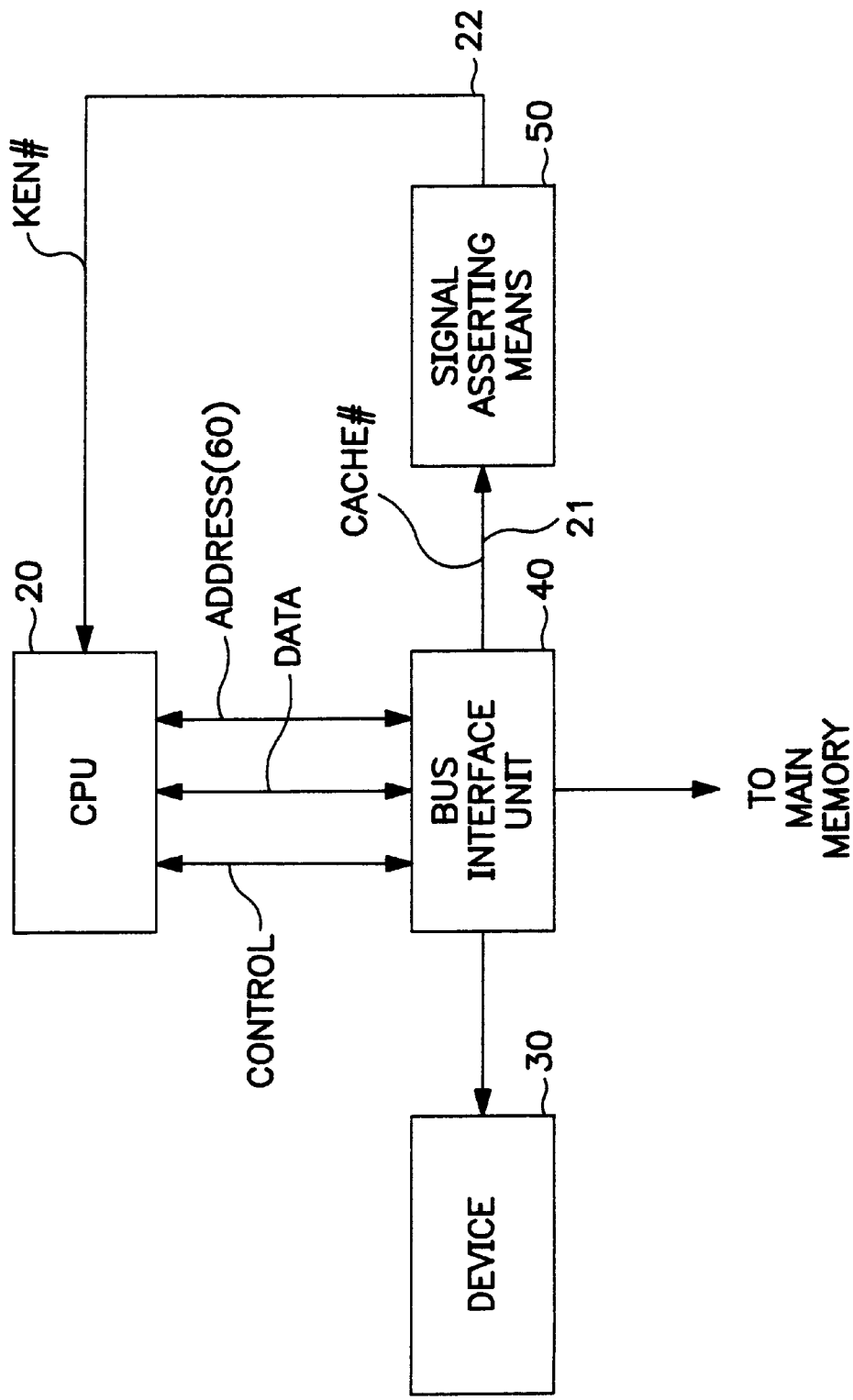
FIG. 3 is a block diagram illustrating the system of the present invention.

Referring now to FIG. 3, the invention provides a system 10 for transferring data between a processor 20 and a device 30, which resides within an address space. The address space includes a cacheable address space and a non-cacheable address space, and the device 30 resides in the non-cacheable address space at a non-cacheable address. The system 10 comprises the processor 20, the device 30, a bus interface unit 40, and signal asserting means 50.

The processor 20, such as a Pentium™ processor, is configured in accordance to the invention to assert an address onto an address bus 60, with the address being a non-cacheable address. The device 30 resides at the non-cacheable address in the non-cacheable address space.

The bus interface unit 40, constructed in accordance to the invention, is coupled to the processor 20 for asserting a signal on line 21 indicating that the processor 20 has data ready for burst mode transfer between the processor 20 and the device 30. As discussed above, this signal on line 21 corresponds generally to the CACHE# signal defined by the Pentium™ bus specification, but is modified to have the semantic meaning discussed above.

The signal asserting means 50, constructed in accordance with the invention, is responsive to the signal on line 21 from the bus interface unit 40. The signal asserting means 50 asserts a signal on line 22 indicating that the device 30 is ready for the burst mode transfer. As discussed above, the signal asserted by the signal asserting means on line 22 corresponds generally to the KEN# signal as defined by the Pentium™ bus specification, but is modified to have the semantic meaning discussed above. The processor 20 is responsive to the signal asserted by the signal asserting means 50 on line 22 to transfer a plurality of bytes in burst mode between the processor 20 and the device 30.

Turning to FIG. 4, as discussed above the processor 20 is configured to select a plurality of byte locations in the address space, such as an eight-byte quadword memory location 400. One byte-enable signal (BE7:BE0) is provided corresponding to each byte in the quadword. Each byte-enable signal enables its corresponding byte in the quadword 400 for access. During an incrementing burst mode transfer, the processor 20 is configured to de-assert each of the byte-enable signals (BE7:BE0), and is configured to increment the non-cacheable address after transferring at least one byte of data in a given bus cycle of the burst mode transfer. In this manner, the next consecutive quadword is selected, and the byte enable lines (BE7:BE0) are re-asserted.

During a non-incrementing burst mode transfer, the processor 20 asserts at least one of the byte-enable signals (BE7:BE0), depending on which one or more of the byte locations are selected to participate in the burst mode transfer. To support such non-incrementing burst mode transfers, the processor 20 is configured to transfer each of the plurality of bytes in the burst mode transfer to a single non-cacheable address within the selected quadword 400.

Although illustrated and described herein with reference to certain specific embodiments, the present invention is nevertheless not intended to be limited to the details shown. Rather, various modifications may be made in the details within the scope and range of equivalents of the claims and without departing from the invention. Specifically, the invention can be applied to each Pentium™ processor manufactured or supplied by the several Pentium™ processor vendors. Also, the term "device" as used herein refers to any memory or IO-mapped component residing on a Pentium™ address bus.

What is claimed:

1. A method of transferring data between a processor and an address within an address space including a cacheable address space and a non-cacheable address space, the address residing in the non-cacheable address space and being a non-cacheable address, the method comprising the steps of:

a) asserting the non-cacheable address onto an address bus;

b) asserting a CACHE# signal indicating that the processor has data ready for burst mode transfer between the processor and a device residing at the non-cacheable address;

c) asserting a KEN# signal indicating that the device is ready for the burst mode transfer; and d) performing a burst mode transfer of a plurality of bytes between the processor and the non-cacheable address.

2. The method of claim 1, wherein the step of performing a burst mode transfer includes transferring a plurality of bytes between the processor and the device, and further comprising repeating the step of transferring for each byte of data in the plurality of data bytes.

3. The method of claim 1, wherein the step of asserting the non-cacheable address includes asserting a non-cacheable address selecting a plurality of byte locations, and further comprising the step of de-asserting a plurality of signals, one each of the signals corresponding to one each of the plurality of byte locations.

4. The method of claim 1, wherein the step of asserting the non-cacheable address includes asserting a non-cacheable address selecting a plurality of byte locations, and further comprising the step of asserting at least one of a plurality of signals, one each of the signals corresponding to one each of the plurality of byte locations.

5. The method of claim 1, further comprising the step of incrementing the non-cacheable address after transferring at least one byte of data.

6. The method of claim 1, wherein the step of asserting the non-cacheable address includes asserting a non-cacheable address selecting an eight-byte location, and wherein the step of transferring includes transferring eight bytes of data between the processor and the eight-byte location selected by the non-cacheable address.

7. The method of claim 2, wherein the step of repeating the transfer of the data bytes includes transferring each of the plurality of bytes to the same non-cacheable address.

8. A method of performing a burst mode transfer of a plurality of bytes between a processor and a sequence of non-cacheable addresses, the burst mode transfer including at least one bus cycle, the method comprising the steps of:

a) asserting a non-cacheable address onto an address bus, the non-cacheable address selecting a first plurality of non-sequential byte locations;

b) asserting a first signal indicating that the processor has data ready for burst mode transfer between the processor and a device residing at the non-cacheable address;

c) asserting a second signal indicating that the device is ready for the burst mode transfer;

d) de-asserting a plurality of byte-enable signals, one each of the byte-enable signals corresponding to one each of the non-sequential byte locations selected by the non-cacheable address;

e) transferring a plurality of data bytes between the processor and the non-sequential byte locations selected by the non-cacheable address at which the device resides;

f) incrementing the non-cacheable address asserted on the address bus to select a second plurality of byte locations; and g) repeating steps e) and f) for each bus cycle in the burst mode transfer.

9. A method of performing a burst mode transfer of a plurality of bytes between a processor and a non-cacheable address, the burst mode transfer including at least one bus cycle, the method comprising the steps of:

a) asserting the non-cacheable address onto an address bus, the non-cacheable address selecting a plurality of non-cacheable, non-sequential byte locations;

b) asserting a first signal indicating that the processor has data ready for burst mode transfer between the processor and a device residing at least one of the non-cacheable, non-sequential byte locations;

c) asserting a second signal indicating that the device is ready for the burst mode transfer;

d) asserting at least one of a plurality of byte-enable signals, one each of the byte-enable signals corresponding to one each of the non-cacheable, non-sequential byte locations selected by the non-cacheable address;

e) transferring at least a byte of data between the processor and the at least one byte location corresponding to the asserted byte-enable signal; and f) repeating step e) for each bus cycle in the burst mode transfer.

10. The method of claim 9, wherein the step of transferring includes transferring each of the plurality of bytes between the processor and a single non-cacheable address.

11. A system for performing burst mode transfers between a processor and a device residing at least one non-cacheable address, the system comprising:

a processor for asserting the non-cacheable address, at which the device resides, onto an address bus;

a bus interface unit coupled to the processor for asserting a first signal indicating that the processor has data ready for burst mode transfer between the processor and the device;

means, responsive to the first signal, for asserting a second signal indicating that the device is ready for the burst mode transfer; and the processor being responsive to the second signal to perform a burst mode transfer of a plurality of non-sequential bytes between the processor and the device.

12. The system of claim 11, wherein the means for asserting the second signal includes a non-cacheable address logic.

13. The system of claim 11, wherein the processor is configured to support a sequential burst mode by selecting a plurality of byte locations corresponding to the non-cacheable address, and is configured to de-assert each one of a plurality of byte-enable signals, one each of the byte-enable signals corresponding to one each of the plurality of byte locations.

14. The system of claim 13, wherein the processor is configured to increment the non-cacheable address after transferring at least one byte of data.

15. The system of claim 13, wherein the processor is configured to select an eight-byte location corresponding to the non-cacheable address, and is configured to de-assert eight byte-enable signals, one each of the byte-enable signals corresponding to one each of the bytes in the eight-byte location.

16. The system of claim 11, wherein the processor is configured to support a non-sequential burst mode by selecting a plurality of byte locations corresponding to the non-cacheable address, and is configured to assert at least one of a plurality of byte-enable signals, one each of the byte-enable signals corresponding to one each of the plurality of byte locations.

17. The system of claim 16, wherein the processor is configured to transfer each of the plurality of bytes in the burst mode transfer to a single non-cacheable address.

18. The system of claim 16, wherein the processor is configured to select an eight-byte location corresponding to the non-cacheable address, and is configured to assert at least one of the eight byte-enable signals, one each of the byte-enable signals corresponding to one each of the bytes in the eight-byte location.

\* \* \* \* \*